United States Patent
Misani et al.

(10) Patent No.: US 11,420,477 B2
(45) Date of Patent: Aug. 23, 2022

(54) MOTORCYCLES TYRE

(71) Applicant: Pirelli Tyre S.p.A., Milan (IT)

(72) Inventors: Pierangelo Misani, Milan (IT); Andrea Schiavolin, Milan (IT); Matteo Torchiana, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 593 days.

(21) Appl. No.: 16/336,691

(22) PCT Filed: Sep. 11, 2017

(86) PCT No.: PCT/IB2017/055466
§ 371 (c)(1),
(2) Date: Mar. 26, 2019

(87) PCT Pub. No.: WO2018/060796
PCT Pub. Date: Apr. 5, 2018

(65) Prior Publication Data
US 2019/0275843 A1    Sep. 12, 2019

(30) Foreign Application Priority Data

Sep. 28, 2016    (IT) .......................... 102016000097453

(51) Int. Cl.
*B60C 11/11*    (2006.01)
*B60C 11/03*    (2006.01)
*B60C 11/13*    (2006.01)

(52) U.S. Cl.
CPC ............. *B60C 11/11* (2013.01); *B60C 11/033* (2013.01); *B60C 11/1307* (2013.01);
(Continued)

(58) Field of Classification Search
CPC . B60C 11/11; B60C 2200/10; B60C 2200/14; B60C 11/033; B60C 2011/0365; B60C 2011/0367; B60C 11/1307; B60C 2011/1338
See application file for complete search history.

(56) References Cited

U.S. PATENT DOCUMENTS

| | | | | |
|---|---|---|---|---|
| 2002/0061979 | A1* | 5/2002 | Wolff | C08L 23/16 525/330.9 |
| 2012/0267019 | A1* | 10/2012 | Gatti | B60C 9/22 152/209.18 |
| 2013/0284333 | A1* | 10/2013 | Ishida | B60C 11/12 152/209.18 |

FOREIGN PATENT DOCUMENTS

| | | |
|---|---|---|
| CN | 102180065 A * | 9/2011 |
| CN | 102470698 A | 5/2012 |

(Continued)

OTHER PUBLICATIONS

English translation of CN-202826988-U by EPO. (Year: 2013).*
(Continued)

*Primary Examiner* — Leith S Shafi
*Assistant Examiner* — Inja Song
(74) *Attorney, Agent, or Firm* — Finnegan, Henderson, Farabow, Garrett & Dunner, L.L.P.

(57) ABSTRACT

Motorcycles tyre, comprising: a radial carcass structure (2); a belt structure (6) applied in radially outer position with respect to the radial carcass structure (2); a tread band (8) applied in radially outer position with respect to the belt structure (6). The tyre (1) has a curvature ratio (f/C) greater than or equal to about 0.25. The tread band (8) comprises: a plurality of blocks (14) mutually spaced so as to define a tread pattern with a void/solid ratio (1−Sb/St) comprised between about 25% and about 50%; transverse grooves (11) placed in succession along the circumferential extension of the tyre (1) and each substantially extending over the entire axial width of the tread band (8). Each transverse groove (11) substantially extends along an axial direction. Two successive transverse grooves (11) circumferentially delimit an assembly (12) of blocks (14) placed in succession over the entire axial width of the tread band (8). Circumferential grooves (13) delimit the blocks (14) of an assembly (12). A (Continued)

ratio between a circumferential length (L1) of the blocks (14) and a width (L2) of the transverse grooves (11) is equal to or greater than about 2.

17 Claims, 5 Drawing Sheets

(52) U.S. Cl.
CPC ............... *B60C 2011/0365* (2013.01); *B60C 2011/0367* (2013.01); *B60C 2011/0372* (2013.01); *B60C 2011/1338* (2013.01); *B60C 2200/10* (2013.01); *B60C 2200/14* (2013.01)

(56) References Cited

FOREIGN PATENT DOCUMENTS

| | | | | |
|---|---|---|---|---|
| CN | 202826988 U | * | 3/2013 | |
| CN | 202826988 U | | 3/2013 | |
| CN | 103373180 A | | 10/2013 | |
| EP | 2 307 208 B1 | | 6/2013 | |
| JP | 3-169724 | | 7/1991 | |
| JP | 03169724 A | * | 7/1991 | |
| WO | WO 2013/046004 A2 | | 9/2012 | |
| WO | WO-2013046004 A2 | * | 4/2013 | ......... B60C 11/0302 |

OTHER PUBLICATIONS

English translation of JP-03169724-A by EPO. (Year: 1991).*
English translation of CN-102180065-A by EPO. (Year: 2011).*
First Office Action dated Nov. 3, 2020, from the China National Intellectual Property Administration, in counterpart Chinese Application No. 201780068588.6.
International Search Report form the European Patent Office in corresponding International Application No. PCT/IB2017/055466 dated Jan. 2, 2018.
Written Opinion of the International Searching Authority from the European Patent Office in corresponding International Application No. PCT/IB2017/055466 dated Jan. 2, 2018.

* cited by examiner

MOTORCYCLES TYRE

TECHNICAL FIELD OF THE INVENTION

The object of the present invention is a motorcycles tyre.

The present invention is situated in the field of tyres intended to be mounted on the front wheel and/or on the rear wheel of motorcycles defined as "big enduro" or "dual purpose" with medium-large engine capacity (e.g. about 600-1200 cm$^3$ or even greater) and/or medium-high power (e.g. 70 cv or greater) and with motorcycle mass in driving position for example about 150 Kg or greater.

STATE OF THE ART

Motorcycles tyre are for example known from the documents WO 2013/046004 and EP 2 307 208.

The document WO 2013/046004, on behalf of the same Applicant, illustrates a motorcycles tyre for "big enduro" or "dual purpose" having a tread band comprising a central annular portion with a void/solid ratio not smaller than 10% and two annular shoulder portions. The central portion has a module that is circumferentially replicated. The module comprises a pair of first grooves with substantially circumferential progression and a plurality of second grooves substantially transversely arranged. The first grooves and the second grooves identify solid portions in each module. The second grooves have at least one end moved away from the adjacent first groove so as to form a substantially continuous tread portion adapted to connect at least two solid portions.

The document EP 2 307 208, on behalf of the same Applicant, illustrates a motorcycles tyre for "dual purpose" motorcycles comprising a tread band having a central portion and two shoulder portions. The central portion has a module that is circumferentially replicated and comprising: at least two longitudinal grooves that are tilted with respect to an equatorial plane; at least two transverse grooves which intersect the two longitudinal grooves so as to define at least one block. The central portion has a void/solid ratio greater than the void/solid ratio of the shoulder portions.

SUMMARY

Motorcycles of "big enduro" or "dual purpose" type on the market in recent years have increasingly higher powers, weights and engine capacities. Such motorcycles are adapted for daily house-work use but also for long transfers on road, with occasional use off-road. Motorcycles for on-off road use with 1200 cm$^3$ engine capacity are for example present on the market, with powers of about 110 cv and mass in driving configuration of about 240 kg.

Recently, there has been a tendency by users to use such means not only for occasional off-road uses (mainly on gravel/dirt roads) but also for driving and handling on off-road surfaces that are quite difficult, typically drivable with motorcycles that mainly have off-road use.

With tyres mounted on the wheels of such motorcycles, high performances are required both on road (stability at high speeds, holding in dry and wet conditions, handling) and off-road (traction, controllability and directionality) together with the capacity to travel many kilometers.

In particular, the tyres of such motorcycles must have qualities of comfort and wear regularity in road travel and, since they are often used in every climactic condition throughout the year, reliability and performance are also required on road surfaces with reduced adherence.

For off-road use, the same tyres are also required to have high levels of adherence and traction on loose terrain of different nature (e.g. sand, mud, gravel), so to be able to effectively transmit to the ground driving and breaking torques that are even high. Such tyres must also ensure the aforesaid performances on wet terrain.

According to the experience of the Applicant, the aforesaid characteristics at least partly contrast each other.

The Applicant has in fact observed that knobbed tyres—which allow a high traction in off-road conditions—usually have limited performances both in terms of maximum speed of use and in terms of performances on wet roads, as well as low number of kilometers traveled and high vibrations that also involve high noise. The Applicant has also observed that modifying the tread in order to increase the performances of the tyre in road travel can involve the reduction of performances in terms of traction, controllability and directionality on loose terrain (slippery, sandy, muddy) due to the immediate filling with earth/mud in the tracks/grooves of the tread.

The Applicant has also observed that the modification of the tread in order to increase the performances of the tyre in road travel, in addition to compromising the off-road performances does not in any case allow attaining satisfying on-road performances.

The Applicant has generally encountered that tyres which attempt to reconcile the use on road with that off-road tend to attain compromise solutions which in reality do not offer satisfactory performances in either of the two areas (on-road or off-road).

In the context of tyres for wheels of motorcycles of the above-indicated type, the Applicant has sensed the need to propose a motorcycles tyre for motorcycles of "big enduro" or "dual purpose" type that is capable of offering optimal on-road performances (at the level of a pure road tyre) and simultaneously provide high adherence and traction levels off-road.

The Applicant has unexpectedly found that by making, in a tyre with carcass and belt structure typically for the road, a plurality of transverse grooves and the consequent formation of assemblies of blocks, it is possible to improve the on-road performances, clearly improving without worsening the adherence and traction performances on loose terrain.

According to one aspect, the present invention regards a motorcycles tyre, comprising:

a radial carcass structure;

a belt structure applied in radially outer position with respect to the radial carcass structure;

a tread band applied in radially outer position with respect to the belt structure;

the tyre having a curvature ratio greater than or equal to about 0.25;

wherein the tread band comprises:

a plurality of blocks mutually spaced so as to define a tread pattern with a void/solid ratio equal to or smaller than 50%, preferably comprised between about 25% and about 50%;

transverse grooves placed in succession along the circumferential extension of the tyre and each substantially extending over the entire axial width of the tread band;

wherein each transverse groove substantially extends along an axial direction;

wherein two successive transverse grooves circumferentially delimit an assembly of blocks placed in succession over the entire axial width of the tread band;

circumferential grooves delimiting the blocks of an assembly;

wherein a ratio between a circumferential length of the blocks and a width of the transverse grooves is equal to or greater than about 2.

By "equatorial plane" of the tyre it is intended a plane perpendicular to the rotation axis of the tyre which divides the tyre into two symmetrically equal parts.

The terms "radial" and "axial" and the expressions "radially inner/outer" and "axially inner/outer" are used by referring respectively to a direction perpendicular and to a direction parallel to the rotation axis of the tyre.

The terms "circumferential" and "circumferentially" are used with reference to the direction of the annular extension of the tyre, i.e. to the rolling direction of the tyre.

By "void/solid ratio" it is intended the value complementary to the value 1 of the ratio between the total of the top surfaces of the blocks of a specific portion of the tread pattern of the tyre (possibly of the entire tread pattern) and the overall surface of the specific portion of tread pattern (possibly of the entire tread pattern). With top surfaces of the blocks, it is intended the radially outer surfaces delimited by the radially outer edges of the blocks.

With "tread pattern" it is intended the representation of all the points of the tread band on a plane perpendicular to the equatorial plane of the tyre and tangent to the maximum diameter of the tyre. The sizes of angles and/or linear quantities (distances, widths, lengths, etc.), and/or surfaces are intended as referring to the tread pattern as defined above.

In particular by "width of the tread band" it is intended the width of the extension of the tread band itself on the aforesaid plane considered between the axially outer edges of the axially outermost blocks.

With "extension of the tread band" it is intended the extension of the tread band itself on the aforesaid plane.

By "curvature ratio" of the tyre it is intended the ratio between the distance (also termed curvature height) comprised between the radially highest point (top) of the tread band and the maximum transverse section width (also termed maximum chord) of the tyre, and the same maximum transverse section width of the tyre, in a transverse section thereof.

By "maximum transverse section width" (or maximum chord) it is intended the maximum width of the profile of the tyre, in other words the size of the segment having as ends the two axially outermost points of the profile of the tread band. By ratio "curvature height to total height" it is intended the ratio between the curvature height and the section height.

The section height is measured, on the equatorial plane, between the top of the tread band and the fitting diameter, identified by a reference line passing through the beads of the tyre.

By "circumferential length of the blocks" it is intended the average size of the extension along a circumferential direction of the blocks. Said average size is calculated on the extension of the tread band on the aforesaid plane. Said average size is calculated by dividing the area of the top surfaces of a block (measured on the extension of the tread band on the aforesaid plane) by the maximum axial length of said block (measured on the extension of the tread band on the aforesaid plane).

By "width of a transverse groove" it is intended the average size of the extension along a circumferential direction of the transverse groove. Said average size is calculated on the extension of the tread band on the aforesaid plane. Said average size is calculated by dividing the area of the transverse groove (measured on the extension of the tread band on the aforesaid plane) by the axial length of said transverse groove (measured on the extension of the tread band on the aforesaid plane) which coincides with the width of the tread band.

By "height of the blocks" or "depth of the transverse grooves" it is intended the distance, measured perpendicular to the top surface of the blocks, between a bottom surface of the transverse grooves and said top surface. The present invention, in at least one of the aforesaid aspects, can have one or more of the preferred characteristics that are described hereinbelow.

Preferably, the belt structure comprises at least one belt layer formed by rubber-covered cords arranged substantially parallel and side-by-side to form a plurality of coils. Preferably, such coils are substantially oriented according to the circumferential direction (typically with an angle between 0° and 5°), such direction usually being termed "at zero degrees" with reference to the lying position thereof with respect to the circumferential direction of the tyre.

Preferably, in particular but not exclusively if the tyre is a rear tyre, the belt structure is at zero degrees.

Preferably, in particular if the tyre is a front tyre, the belt structure comprises at least one first and one second belt layer that are radially superimposed, wherein cords of the first belt layer are cross with respect to cords of the second belt layer.

Preferably, the cords of the first belt layer delimit with the cords of the second belt layer an angle equal to or greater than about 20°.

Preferably, the cords of the first belt layer delimit and/or the cords of the second belt layer delimit, with a circumferential direction of the tyre, an angle equal to or greater than about 10°.

Preferably, the cords of the first belt layer are obliquely oriented with respect to the circumferential direction of the tyre, while the cords of the second belt layer also have oblique orientation but substantially symmetrically cross with respect to the cords of the first layer.

Preferably, the maximum transverse section width for a rear tyre is greater than or equal to about 130 mm. Preferably, the maximum transverse section width for a rear tyre is smaller than or equal to about 190 mm.

Preferably, the maximum transverse section width for a front tyre is greater than or equal to about 90 mm. Preferably, the maximum transverse section width for a front tyre is smaller than or equal to about 130 mm.

Preferably, the curvature height "f" for a rear tyre is greater than or equal to about 40 mm. Preferably, the curvature height "f" for a rear tyre is smaller than or equal to about 60 mm.

Preferably, the curvature height "f" for a front tyre is greater than or equal to about 35 mm. Preferably, the curvature height "f" for a front tyre is smaller than or equal to about 60 mm. Preferably, the curvature ratio is greater than or equal to about 0.25 for a rear tyre. Preferably, the curvature ratio is smaller than or equal to about 0.35 for a rear tyre. Preferably, the curvature ratio is greater than or equal to about 0.30 for a front tyre. Preferably, the curvature ratio is smaller than or equal to about 0.40 for a front tyre.

Preferably, the void/solid ratio is equal to or smaller than about 40%.

Preferably, the void/solid ratio is equal to or greater than about 28%.

Preferably, said ratio between the circumferential length of the blocks and the circumferential width of the transverse grooves is equal to or greater than about 2.1.

Preferably, said ratio between the circumferential length of the blocks and the circumferential width of the transverse grooves is equal to or smaller than about 4.5, preferably equal to or smaller than about 4.0.

Preferably, said circumferential length is greater than or equal to about 25 mm for the front tyre and greater than or equal to about 35 mm for the rear tyre.

Preferably, said circumferential length is smaller than or equal to about 40 mm for the front tyre and smaller than or equal to about 50 mm for the rear tyre.

Preferably, a ratio between the circumferential length of one of the blocks and a height of said block is greater than or equal to about 3. Preferably, said ratio between the circumferential length of one of the blocks and a height of said block is greater than or equal to about 3.5.

Preferably, said ratio between the circumferential length of one of the blocks and the height of said block is smaller than or equal to about 5.5 for the front tyre and about 5 for the rear tyre.

Preferably, the height of the block is greater than or equal to about 6 mm for the front tyre and about 8.5 mm for the rear tyre.

Preferably, the height of the block is smaller than or equal to about 8.5 mm for the front tyre and about 11 mm for the rear tyre.

Preferably, at least some of the circumferential grooves of an assembly of blocks are at least partially misaligned with respect to the respective circumferential grooves of an adjacent assembly of blocks.

Preferably, at least some of the circumferentially successive circumferential grooves, at least partially misaligned, have a gap greater than or equal to about 4 mm.

Preferably, at least some of the circumferentially successive circumferential grooves, at least partially misaligned, have a gap smaller than or equal to about 6.5 mm.

Preferably, the tyre has a ratio of curvature height to total height greater than or equal to about 0.4 for the rear tyre and about 0.4 for the front tyre.

Preferably, the tyre has a ratio of curvature height to total height smaller than or equal to about 0.6 for the rear tyre and about 0.6 for the front tyre.

Preferably, each block has a substantially quadrilateral peripheral edge.

Preferably, said quadrilateral delimits, between two adjacent sides, an angle comprised between about 70° and about 100°.

Preferably, the assembly of blocks comprises at least three blocks, more preferably three, four or six blocks.

Preferably, assemblies of blocks comprising three blocks are circumferentially alternated with assemblies of blocks comprising six blocks.

Preferably, the assembly of blocks comprises a single central block placed astride an equatorial plane of the tyre.

Preferably, the assembly of blocks comprises two central blocks placed on the sides of an equatorial plane of the tyre.

Preferably, the assembly of blocks comprises at least one lateral block arranged on each of the two sides of the central block or of the two central blocks.

Preferably, the assembly of blocks comprises two lateral blocks arranged on each of the two sides of the central block or of the two central blocks.

Preferably, assemblies of blocks comprising a single central block are circumferentially alternated with assemblies of blocks comprising two central blocks.

Preferably, the two central blocks have an overall axial width smaller than an axial width of the single central block.

Preferably, assemblies of blocks comprising two central blocks having a first overall axial width are circumferentially alternated with assemblies of blocks comprising two central blocks having a second overall axial width different from the first overall axial width.

Preferably, the blocks, preferably central, have a rectangular shape.

Preferably, the blocks, preferably lateral, have a trapezoid shape.

Preferably, the blocks have at least one concave side, preferably defining an edge.

Preferably, the lateral blocks have a greater base of the trapezoid axially directed towards an equatorial plane of the tyre.

Preferably, the lateral blocks have a greater base of the trapezoid axially directed away from an equatorial plane of the tyre.

Preferably, assemblies of blocks comprising the lateral blocks with the greater base of the trapezoid axially directed towards the equatorial plane are circumferentially alternated with assemblies of blocks comprising the lateral blocks with the greater base of the trapezoid axially directed away from said equatorial plane.

Preferably, the transverse grooves have a wavy or curved middle line, intended as site of the points equidistant from the blocks of the two assemblies which delimit such grooves.

Preferably, the middle lines of two circumferentially successive transverse grooves have curvatures directed towards opposite sides.

Preferably, the tread band has a first module comprising two circumferentially adjacent assemblies of blocks delimiting a respective transverse groove and a second module comprising two circumferentially adjacent assemblies of blocks delimiting a respective transverse groove, wherein said first module and second module are repeated along the circumferential extension of the tyre.

Preferably, a circumferential length of the blocks of the first module is smaller than a circumferential length of the blocks of the second module.

Preferably, the width of the transverse groove of the first module is smaller than the width of the transverse groove of the second module.

Preferably, the transverse grooves have a depth greater than a depth of at least some of the circumferential grooves.

Preferably, the transverse grooves have a depth equal to a depth of at least some of the circumferential grooves.

Preferably at least one portion of the tread band comprises a vulcanised elastomeric material obtained by vulcanising an elastomeric blend comprising 100 phr of at least one elastomeric polymer, from 30 to 130 phr of at least one reinforcing filler comprising at least 55% of an inorganic material selected from silica alumina, silicates, hydrotalcite, calcium carbonate, kaolin, titanium dioxide and/or mixtures thereof.

Further characteristics and advantages will be clearer from the detailed description of preferred but not exclusive embodiments of motorcycles tyre according to the present invention.

DESCRIPTION OF THE DRAWINGS

Such description will be set forth hereinbelow with reference to the enclosed drawings, provided only for explanatory purposes and hence non-limiting, in which.

DETAILED DESCRIPTION

Figure 3:
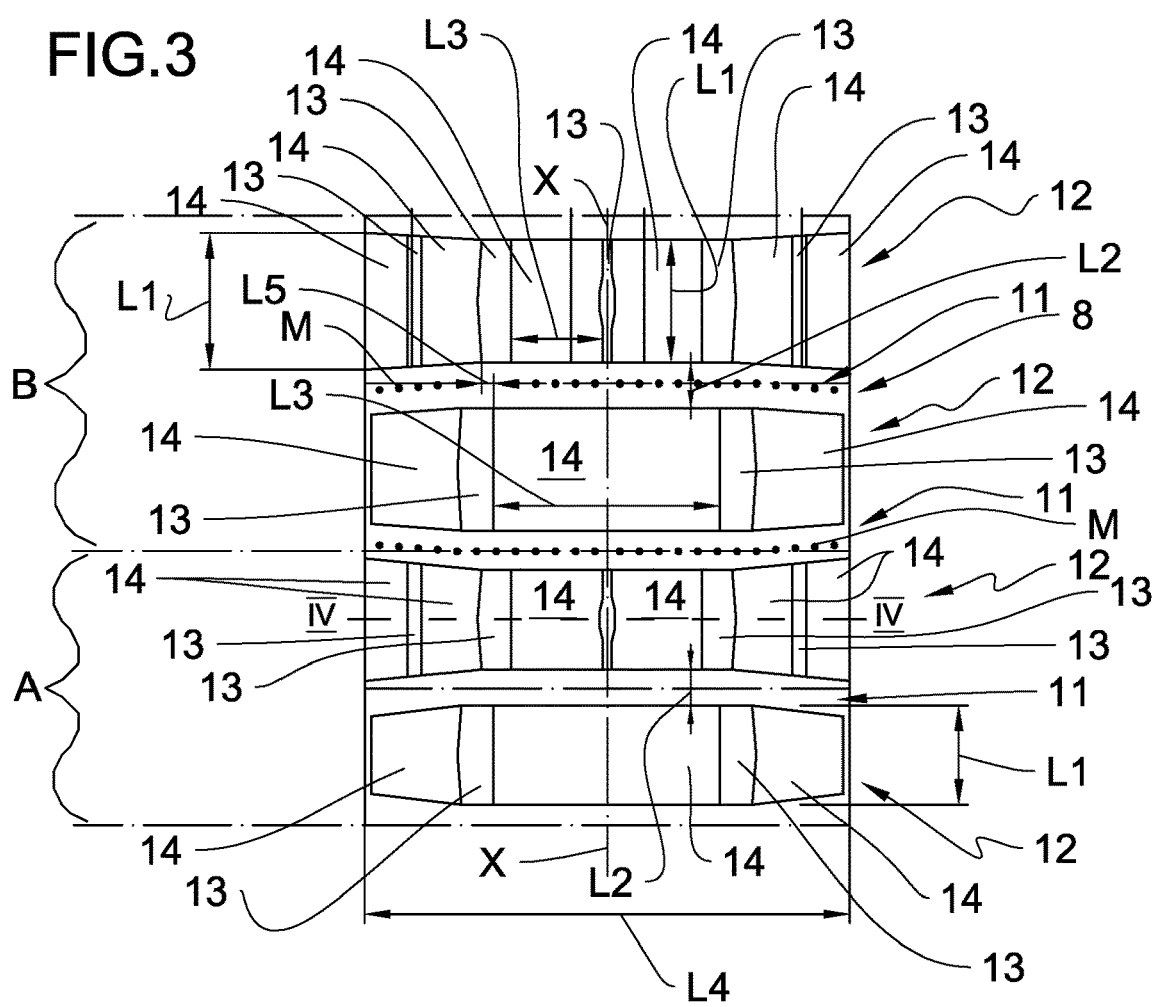
FIG. 3 shows the extension of a wider portion of the tread band of the tyre of FIGS. 1 and 2 on a plane perpendicular to the equatorial plane of the tyre.
Figure 4:
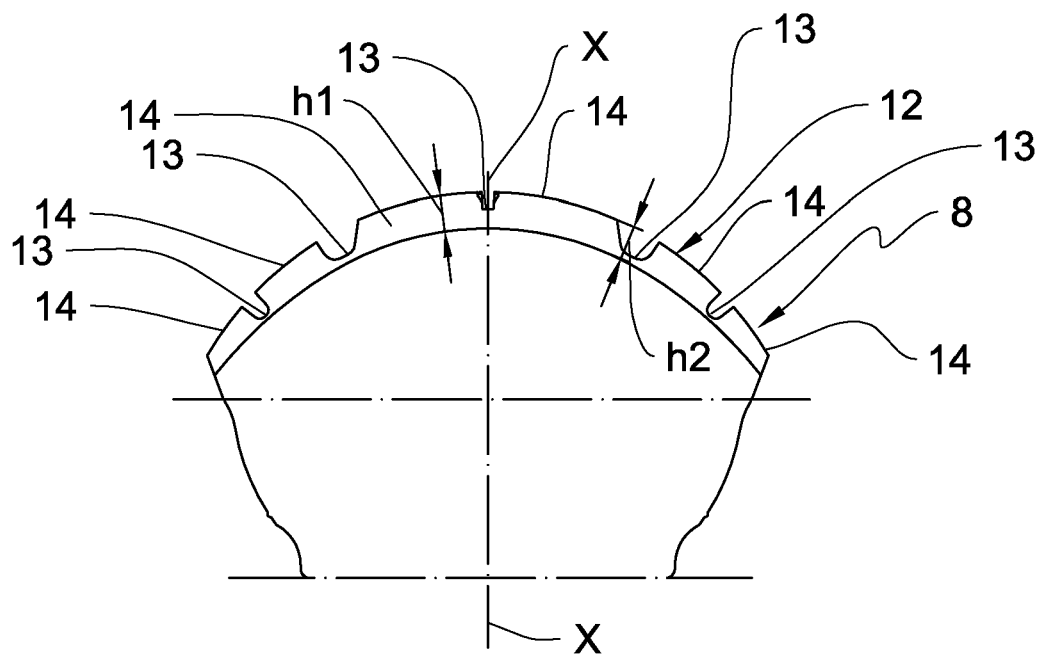
FIG. 4 schematically shows a radial section of the tread band according to the line IV-IV of FIG. 3.
Figure 5:
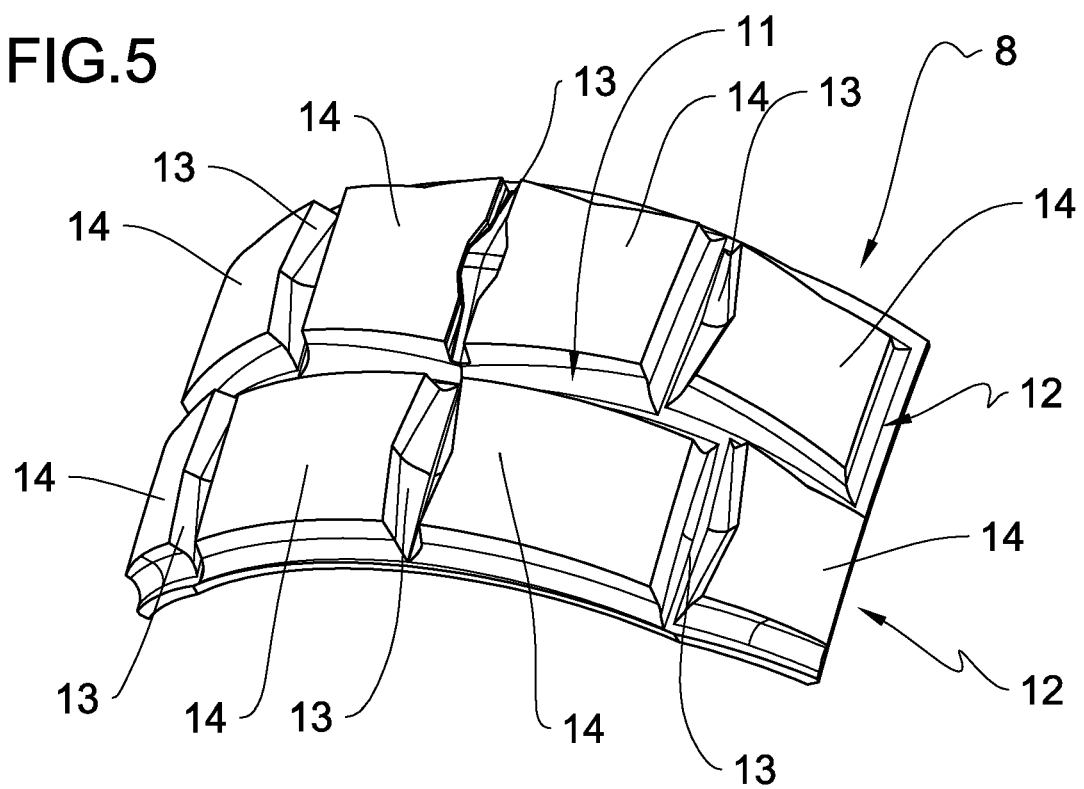
FIG. 5 shows a perspective view of a portion of the tread band of a front motorcycles tyre according to the present invention.
Figure 6:
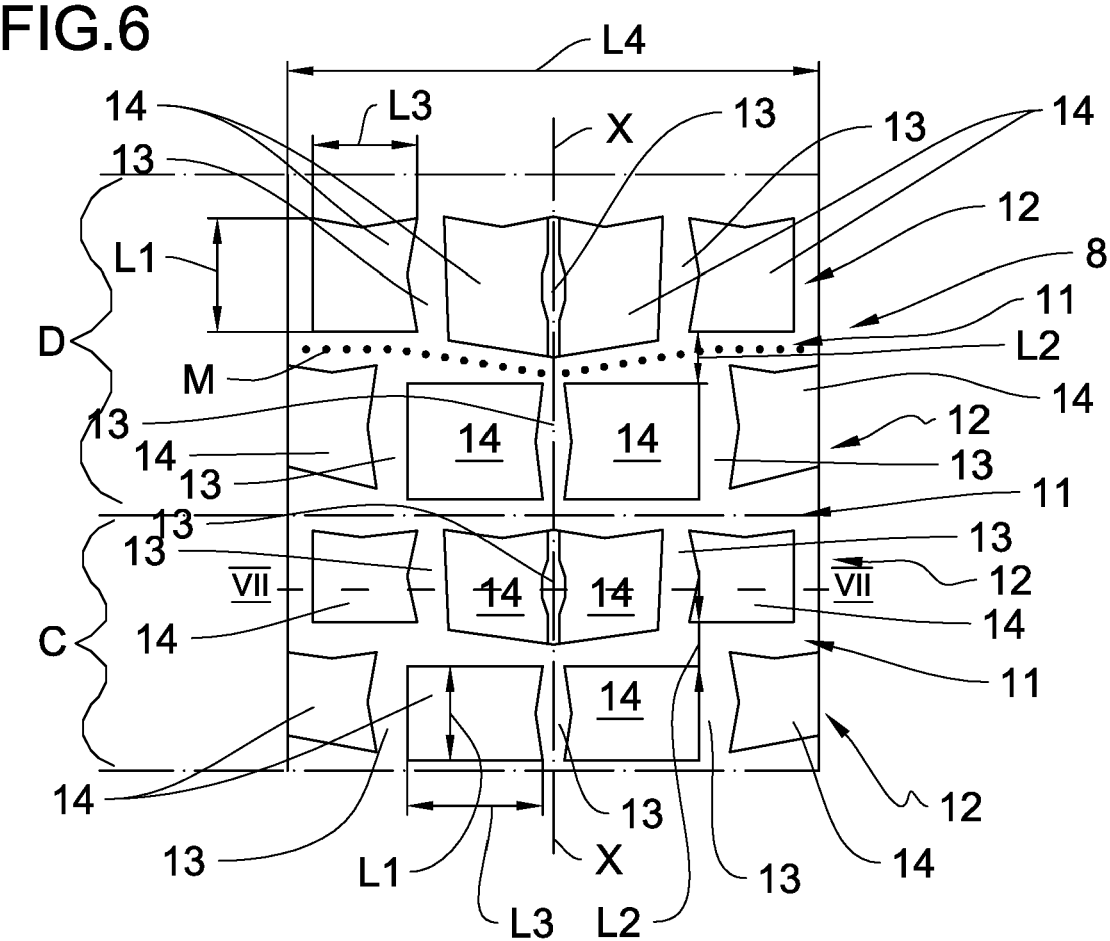
FIG. 6 shows the extension of a wider portion of the tread band of the tyre of FIG. 5 on a plane perpendicular to the equatorial plane of the tyre.
Figure 7:
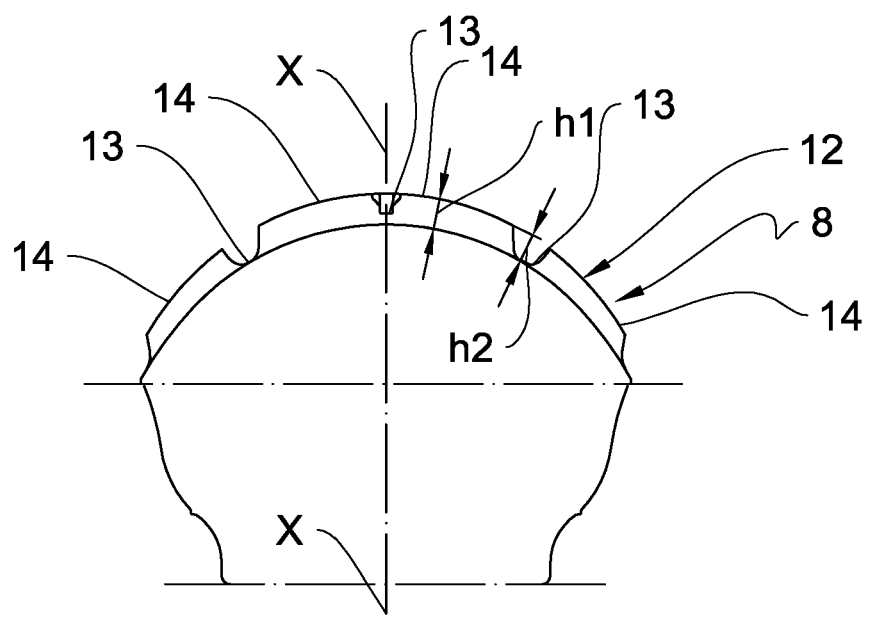
FIG. 7 schematically shows a radial section of the tread band according to the line VII-VII of FIG. 6.

With reference to FIGS. 1-7, reference number 1 overall indicates a tyre for wheels of motorcycles. The tyre 1 of FIGS. 1-4 is a rear tyre. The tyre 1 of FIGS. 5-7 is a front tyre. The tyres 1 illustrated are motorcycles tyre defined as "big enduro" or "dual purpose" with medium-large engine capacity (e.g. about 600-1200 $cm^3$ or even greater) and/or medium-high power (e.g. 70 cv or greater) and motorcycle mass in driving position for example about 150 Kg or greater. In association with the tyre 1, an equatorial plane "X-X" and a rotation axis (not shown in the figures) are defined. The following are also defined: a circumferential direction arranged according to the rotation sense of the tyre 1 and an axial direction perpendicular to the equatorial plane "X-X" and/or parallel to the rotation axis.

The tyre 1 comprises a carcass structure 2 formed by at least one carcass layer 3 comprising a plurality of reinforcement elements (cords).

The carcass structure 2 is typically covered on its inner walls by a sealing layer 100, or so-called "liner", essentially constituted by a layer of air-impermeable elastomeric material, adapted to ensure the hermetic seal of the tyre 1 itself once inflated.

The reinforcement elements, included in the carcass layer 3, preferably comprise textile cords made of fibrous material, not illustrated.

The carcass structure 2 is of radial type, i.e. the cords of said at least one carcass layer 3 are arranged substantially parallel to each other and in radial sense, i.e. according to an angle comprised between 70° and 110°, more preferably between 80° and 100°, with respect to the circumferential direction.

The carcass layer 3 is shaped according to a substantially toroidal configuration and is engaged, by means of opposite circumferential edges 3a thereof, with at least one reinforcement annular structure.

In particular, the opposite circumferential edges 3a of the carcass layer 3 can be turned up around the reinforcement annular structures, each comprising one or more metallic annular bead cores 4 and a tapered elastomeric filler 5 which occupies the space defined between the carcass layer 3 and the corresponding turned-up circumferential edge 3a of the carcass layer 3.

The zone of the tyre 1 comprising the metallic annular bead core 4 and the elastomeric filler 5 forms the so-called bead 9 intended for anchoring the tyre 1 on a corresponding mounting rim, not illustrated.

In one embodiment, the carcass layer 3 is made by means of fitting together a plurality of elastomeric material strips reinforced by the aforesaid cords.

In a non-illustrated embodiment, the carcass layer 3 has its opposite lateral edges associated, without turn-up, with particular reinforcement annular structures provided with two annular inserts. A filler made of elastomeric material can be arranged in axially outer position with respect to the first annular insert. A second annular insert can instead be arranged in axially outer position with respect to the end of the carcass layer 3. Finally, in axially outer position with respect to said second annular insert, and not necessarily in contact therewith, a further filler can be provided that terminates the making of the reinforcement annular structure.

A belt structure 6 is circumferentially applied on the carcass structure 2 in radially outer position, such belt structure 6 comprising at least one belt layer 6a typically formed by textile or metallic rubber-covered cords.

Preferably, the belt structure is of the type at zero degrees, i.e. the belt layer 6a is made by means of cords substantially arranged parallel and side-by-side to form a plurality of coils. Such coils are substantially oriented according to the circumferential direction (typically with an angle between 0° and 5°), such direction normally being termed "at zero degrees" with reference to its lying position with respect to the circumferential direction of the tyre 1.

Preferably, the belt layer 6a typically termed at "zero degrees" can comprise axially adjacent windings of a single cord or of a strip-like element of rubber-covered fabric comprising axially adjacent cords.

The cords of the belt layer 6a at zero degrees are typically metallic cords, made by means of steel wires with high carbon content, i.e. steel wires with a carbon content of at least 0.6-0.7%. Preferably such metallic cords have high elongation (HE).

In a different embodiment, the belt structure provides for two or more radially superimposed belt layers, each layer constituted by elastomeric material reinforced with cords arranged parallel to each other. The layers are arranged in a manner such that the cords of a first belt layer are obliquely oriented with respect to the equatorial plane of the tyre, while the cords of the radially adjacent belt layer also have oblique but cross orientation with respect to the cords of the first layer (the so-called "cross belt") and the same holds true for possible other belt layers. The cross belt typically provides for textile cords.

For the purpose of improving the adhesion between the belt structure 6 and the carcass structure 2, an adhesion layer 7 made of elastomeric material can be provided, interposed between the two aforesaid structures.

In a non-illustrated embodiment, the belt structure 6 can be constituted by at least two radially superimposed layers. Such layers are arranged in a manner such that the cords of the first belt layer are obliquely oriented with respect to the circumferential direction of the tyre 1, while the cords of the second belt layer also have oblique orientation, but are substantially symmetrically cross with respect to the cords of the first layer. The cords of the first belt layer delimit, with the cords of the second belt layer, an angle equal to or greater than about 20°. The cords of the first belt layer delimit and/or the cords of the second belt layer delimit, with a circumferential direction of the tyre, an angle equal to or greater than about 10°. Such belt structure 6 is termed cross ply and is preferably employed for front tyres 1 (an example of which is illustrated in FIGS. 5-7).

A tread band 8 is circumferentially superimposed on the belt structure 6; on such tread band 8, following a moulding operation executed simultaneously with a step of vulcanisation of the tyre 1, circumferential and transverse grooves are typically obtained, arranged to delimit a plurality of blocks according to geometries detailed in the course of the present description.

According to a preferred embodiment, the tread band 8 (as with other components of the tyre) is made by means of an elastomeric material comprising 100 phr of at least one elastomeric diene polymer.

With "elastomeric polymer" it is intended a natural or synthetic polymer which at ambient temperature can be repeatedly stretched to at least double its original length and which after removal of the traction load returns immediately and with force to its approximately original length (definition according to ASTM, E8 committee, Philadelphia 1976).

With "diene polymer" it is intended a polymer or copolymer which derives from the polymerisation of one or more different monomers, among which at least one of these is a conjugate diene (conjugated diolefin).

The elastomeric composition for tyres according to the present invention comprises at least 10 phr of at least one reinforcing filler.

Preferably, the composition comprises at least 20 phr or 30 or phr 40 phr or 50 phr of at least one reinforcing filler.

Preferably, the composition comprises no more than 150 phr or 140 or phr or 130 phr or 120 phr or 110 phr or 100 phr of at least one reinforcing filler.

Preferably, said reinforcing filler is an inorganic material selected from silica alumina, silicates, hydrotalcite, calcium carbonate, kaolin, titanium dioxide and/or mixtures thereof.

Optionally, the reinforcing filler further comprises carbon black.

Preferably, said reinforcing filler comprises carbon black in the elastomeric composition in a quantity comprised between 1 phr and 50 phr, preferably between about 5 phr and about 40 phr.

Preferably the elastomeric material for tread comprises silica as substantially prevalent filler, preferably in a percentage equal to or greater than 50% of the overall filler, preferably greater than 60%, preferably equal to or smaller than 98%. The elastomeric material for tread, as with other tyre components, can also comprise further ingredients and additives as vulcanising system, compatibilisation plasticisers, anti-oxidants and anti-ozonants and all those ingredients known to the man skilled in the art of blends for tyres.

The tyre 1 can also comprise a pair of sidewalls 10 laterally applied on opposite sides to said carcass structure 2.

The tyre 1 has a section height "H" measured, on the equatorial plane "X-X", between the top of the tread band 8 and the fitting diameter, identified by a reference line "r" passing through the beads 9 of the tyre 1.

The tyre 1 also has a maximum transverse section width "C", defined by the distance between the laterally opposite ends "E" of the tread band 8, and a curvature height "f", defined by the distance of the top of the tread band 8 from a line passing through said laterally opposite ends "E", measured on the equatorial plane "X-X" of the tyre 1. The laterally opposite ends "E" of the tread band 8 can be formed with an edge.

The tyre 1 has a "curvature ratio" (f/C) defined by the ratio between the curvature height "f" and the aforesaid maximum transverse section width "C".

The tyre 1 has a ratio of "curvature height to total height" (f/H) given by the ratio between the curvature height "f" and the section height "H".

Figure 1:
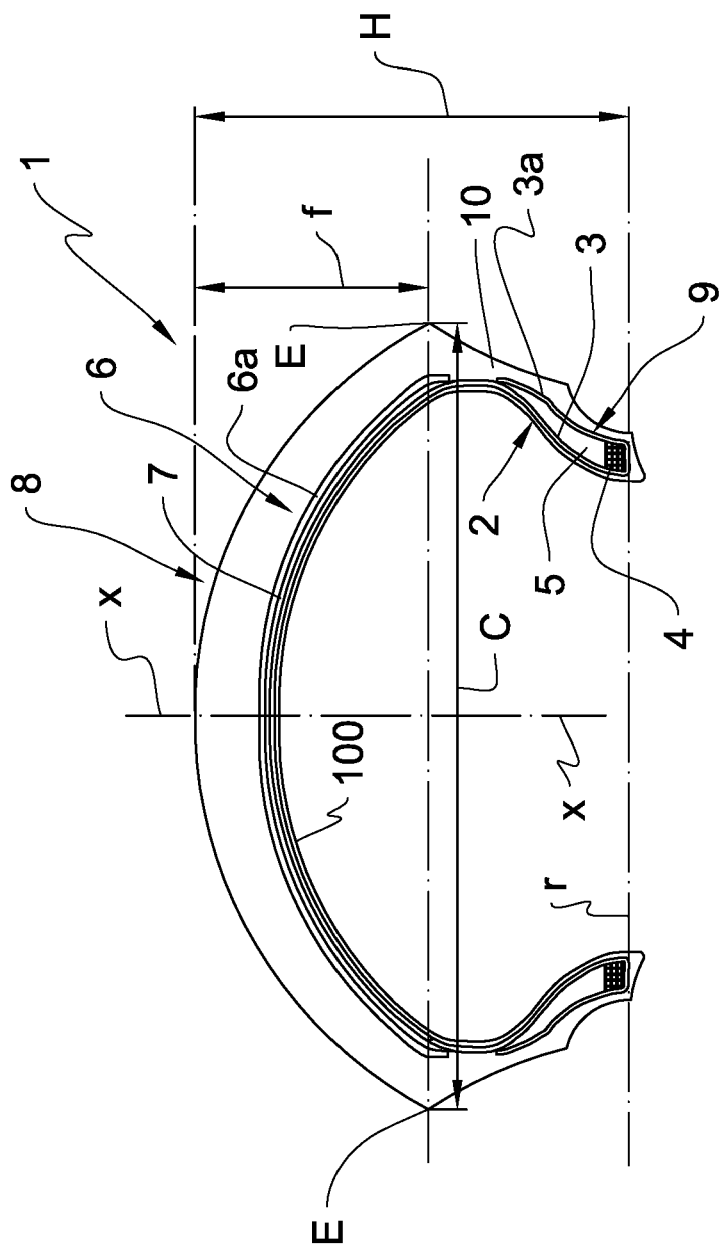
FIG. 1 schematically shows a radial section of a rear motorcycles tyre according to the present invention.

The abovementioned references ("H", "X-X", "r", "C", "f", "E") were indicated in FIG. 1 for the rear tyre but are also identical for the front tyre of FIGS. 5-7.

The rear motorcycles tyre 1 of the invention, like that illustrated in FIGS. 1-4, are intended to be mounted on rear wheels having size of the maximum chord "C" substantially comprised between 130 and 190 mm.

Preferably, the curvature height "f" of the rear tyres 1 according to the invention is comprised between about 40 mm and about 60 mm.

The rear tyres 1 according to the invention, have a curvature ratio "f/C" comprised between about 0.25 and about 0.35. For example, the curvature ratio "f/C" of the tyre 1 of FIG. 1 is about 0.26.

The rear tyres 1 according to the invention have a ratio of curvature height to total height "f/H" comprised between about 0.40 and about 0.60. For example, the ratio of curvature height to total height "f/H" of the tyre 1 of FIG. 1 is about 0.43.

The front motorcycles tyre 1 of the invention, like that illustrated in FIGS. 5-7, are intended to be mounted on front wheels having size of the maximum chord "C" substantially comprised between 90 and 130 mm.

Preferably, the curvature height "f" of the front tyres 1 according to the invention is comprised between about 35 mm and about 60 mm.

The front tyres 1 according to the invention have a curvature ratio "f/C" comprised between about 0.30 and about 0.40. For example, the curvature ratio "f/C" of the tyre 1 of FIG. 7 is about 0.38.

The front tyres 1 according to the invention, have a ratio of curvature height to total height "f/H" comprised between about 0.40 and about 0.60. For example, the ratio of curvature height to total height "f/H" of the tyre 1 of FIG. 7 is about 0.53.

As previously mentioned, the tyre 1 according to the invention is of knobbed type, i.e. the transverse and circumferential grooves delimit a plurality of mutually spaced blocks. Such blocks define a tread pattern with a void/solid ratio comprised between about 25% and about 50%, preferably between about 28% and about 40%. Such ratio is the value complementary to one of the ratio between the total of the top surfaces of the blocks "Sb" of a specific portion of the tread pattern of the tyre 1 and the overall surface "St" of the specific portion of tread pattern (1-Sb/St).

As better seen in FIGS. 2, 3, 5 and 6, the tyre 1 according to the invention (front and rear) has a tread band 8 with transverse grooves 11 placed in succession along the circumferential extension of the tyre 1 itself. Each of the transverse grooves 11 substantially extends over the entire axial width of the tread band 8. Two successive transverse grooves 11 circumferentially delimit between them an assembly of blocks 12 placed in succession over the entire axial width of the tread band 8. Preferably, each of the transverse grooves 11 mainly extends axially, in the sense that at least one plane containing the rotation axis of the tyre 1 traverses the groove without intersecting the two assemblies of blocks 12 which delimit it.

Each assembly of blocks 12 is also divided into single blocks 14 by circumferential grooves 13. Such circumferential grooves 13 are interrupted by the transverse grooves 11 or, in other words, they traverse the entire assembly of blocks 12 and open into the two adjacent transverse grooves 11.

As is visible in the enclosed figures, the blocks 14 can have shape and size different from each other but a ratio between a circumferential length "L1" of the blocks 14 and a width "L2" of the transverse grooves 11 is comprised between about 2 and about 4.5, more preferably between about 2.1 and about 4. In order to simplify illustration, in the enclosed FIGS. 3 and 6 the maximum circumferential length "L1" of the blocks 14 and the maximum width "L2" of the transverse grooves 11 have been indicated; preferably however the following definitions are applied.

By "circumferential length of the blocks" it is intended the average size of the extension along a circumferential direction of the blocks 14. Said average size is calculated on the extension of the tread band 8 (on a plane perpendicular to the equatorial plane of the tyre 1 and tangent to the maximum diameter of the tyre 1). Said average size is calculated by dividing the sum of the area of the top surface of the block 14, measured on the extension of the tread band 8 on the aforesaid plane, by the maximum axial length "L3" of said block 14, measured on the extension of the tread band 8 on the aforesaid plane.

By "width of a transverse groove" it is intended the average size of the extension along a circumferential direction of the transverse groove 11. Said average size is calculated on the extension of the tread band 8 on the aforesaid plane. Said average size is calculated by dividing the area of the transverse groove 11, measured on the extension of the tread band 8 on the aforesaid plane, by the axial length "L4" of said transverse groove 11, measured on the extension of the tread band 8 on the aforesaid plane, which coincides with the width of the tread band 8. Preferably, for a rear tyre 1, like that of FIGS. 2, 3 and 4, the circumferential length "L1" of the blocks 14 is comprised between about 35 mm and about 50 mm. Preferably, for a front tyre, like that of FIGS. 5, 6 and 7, the circumferential length "L1" of the blocks 14 is comprised between about 25 mm and about 45 mm. For example, the rear tyre 1 has a circumferential length "L1" of about 45 mm and a transverse width "L2" of about 15 mm (L1/L2=3). For example, the front tyre 1 has a circumferential length "L1" of about 25 mm and a transverse width "L2" of about 10 mm (L1/L2=2.5).

Preferably, a height "h1" of the blocks 14 is measured from a bottom surface of the transverse grooves 11 and perpendicular to the top surface of the blocks 14. The height of the blocks 14 hence coincides with the depth of the transverse grooves 11 (FIGS. 4 and 7).

A ratio between the circumferential length "L1" of one of the blocks 14 and the height "h1" of said block 14 is comprised between about 3 and about 5.5, preferably between about 3.5 and about 5.5. Preferably, said ratio between the circumferential length "L1" of one of the blocks 14 and the height "h1" of said block 14 is smaller than or equal to about 5.5 for the front tyre 1 and about 5 for the rear tyre 1.

Figure 2:
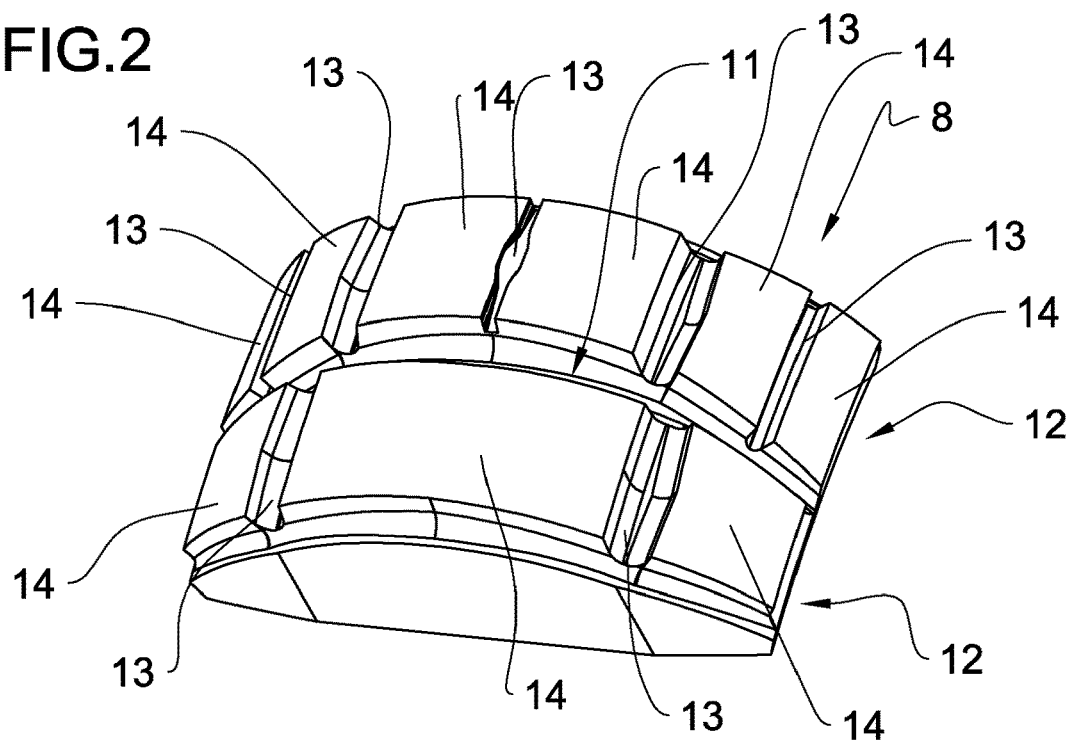
FIG. 2 shows a perspective view of a portion of the tread band of the tyre of FIG. 1.

Preferably, for a rear tyre 1, like that of FIGS. 2, 3 and 4, the height "h1" of the blocks 14 is comprised between about 8.5 mm and about 11 mm. Preferably, for a front tyre 1, like that of FIGS. 5, 6 and 7, the height "h1" of the blocks 14 is comprised between about 6 mm and about 8.5 mm. For example, the rear tyre 1 has a circumferential length "L1" of about 45 mm and a height "h1" of the blocks 14 of about 10 mm (L1/h1=4.5). For example, the front tyre 1 has a circumferential length "L1" of about 30 mm and a height "h1" of the blocks 14 of about 7 mm (L1/h1=4.3).

In some embodiments, the circumferential grooves 13 have a depth "h2" equal to the depth "h1" of the transverse grooves 11. In other embodiments, the circumferential grooves 13 have a depth "h2" smaller than the depth "h1" of the transverse grooves 11. For example, in a rear tyre 1, like that of FIGS. 2, 3 and 4, the circumferential grooves 13 (see in particular FIGS. 2 and 4) are less deep than the transverse grooves 11. For example, in a front tyre 1, like that of FIGS. 5, 6 and 7, at least some of the circumferential grooves 13 (see in particular FIGS. 5 and 7) are as deep as the transverse grooves 11.

In addition, as better seen in FIGS. 3 and 6, at least some of the circumferential grooves 13 of an assembly 12 of blocks 14 are at least partially misaligned with respect to the respective circumferential grooves 13 of an adjacent assembly 12 of blocks 14. In other words, the circumferential grooves 13 of an assembly 12 of blocks 14 are only partially placed in front of the circumferential grooves 13 of the adjacent assemblies 12 and/or face towards the blocks 14 of the adjacent assemblies 12. The circumferential grooves 13 of assemblies 12 of adjacent blocks 14, partially misaligned, have a gap "L5" (FIG. 3), preferably comprised between about 4 mm and about 6.5 mm.

As is visible in both illustrated embodiments, each block 14 has a substantially quadrilateral peripheral edge, e.g. rectangular, square or trapezoidal, with adjacent sides that delimit an angle between them comprised between about 70° and about 100°. In addition, at least one of the sides of the quadrilateral can be concave and is preferably formed by two segments which define an edge of about 170°.

With specific reference to FIGS. 2, 3 and 4, the tread 8 of the illustrated rear tyre 1 has a first module "A" and a second module "B" (FIG. 3) which are repeated along the circumferential extension of the tyre 1 itself. The sequence of the two modules "A" and "B" along the circumferential extension of the tread band 8 can vary.

Each of the two modules "A" and "B" comprises two circumferentially adjacent assemblies 12 of blocks 14 delimiting a respective transverse groove 11 between them. In FIG. 3, the two modules "A" and "B" are adjacent and in addition are separated from each other by a transverse groove 11. The circumferential length "L1" of the blocks 14 of the second module "B" is greater than the circumferential length "L1" of the blocks 14 of the first module "A" and the width "L2" of the transverse groove 13 of the first module "A" is smaller than the width "L2" of the transverse groove 13 of the second module "B".

The first module "A" comprises a first assembly 12 formed by three blocks 14. A central block 14 is placed astride the equatorial plane "X-X" of the tyre 1 and has rectangular shape. A lateral block 14 is arranged on each of the two sides of the central block 14, separated by a circumferential groove 13 and has a trapezoidal shape, with a greater base of the trapezoid axially directed towards the equatorial plane "X-X" of the tyre 1.

The first module "A" comprises a second assembly 12 formed by six blocks 14. Two rectangular central blocks 14 are placed at the sides of the equatorial plane "X-X" of the tyre 1 and separated from each other by a circumferential groove 13.

Two lateral blocks 14 are arranged on each of the two sides of the two central blocks 14, separated by respective circumferential grooves 13 and each have a trapezoidal shape, with a greater base of the trapezoid axially directed away from the equatorial plane "X-X" of the tyre 1. Also the two lateral blocks 14 are separated from each other by a circumferential groove 13.

The two central blocks 14 of the second assembly 12 have an overall axial width smaller than an axial width of the single central block 14 of the first assembly 12.

The second module "B" also comprises a first and a second assembly 12 with blocks 14 similar to those described for the first assembly 12 but with different size, as specified above.

It follows that assemblies 12 of blocks 14 comprising three blocks 14 are circumferentially alternated with assemblies 12 of blocks 14 comprising six blocks 14. In addition, assemblies 12 of blocks 14 comprising a single central block 14 are circumferentially alternated with assemblies 12 of blocks 14 comprising two central blocks 14. In addition, assemblies 12 of blocks 14 comprising the lateral blocks 14 with the greater base of the trapezoid axially directed towards the equatorial plane "X-X" are circumferentially alternated with assemblies 12 of blocks 14 comprising the lateral blocks 14 with the greater base of the trapezoid axially directed away from said equatorial plane "X-X".

The form of the lateral blocks 14 determines a curvature of the transverse grooves 11. The transverse grooves 11 have a wavy or curved middle line "M", intended as site of the points equidistant from the blocks 14 of the two assemblies 12 which delimit such grooves. As is visible in FIG. 3, the middle lines "M" of two circumferentially successive transverse grooves 11 have curvatures directed towards opposite sides.

Also the tread 8 of the front tyre 1 of FIGS. 4, 5 and 6 has a first module "C" and a second module "D" which are repeated along the circumferential extension of the tyre 1 itself. The sequence of the two modules "C" and "D" along the circumferential extension of the tread band 8 can vary.

Each of the two modules "C" and "D" comprises two assemblies 12 of circumferentially adjacent blocks 14 delimiting a respective transverse groove 11 between them. In FIG. 6, the two modules "C" and "D" are adjacent and also separated from each other by a transverse groove 11. The circumferential length "L1" of the blocks 14 of the second module "D" is greater than the circumferential length "L1" of the blocks 14 of the first module "C" and the width "L2" of the transverse groove 13 of the first module "C" is smaller than the width "L2" of the transverse groove 13 of the second module "D".

The first module "C" comprises a first assembly 12 formed by four blocks 14. Two trapezoidal central blocks 14 are placed at the sides of the equatorial plane "X-X" of the tyre 1 and separated from each other by a circumferential groove 13. A lateral block 14 is arranged on each of the two sides of the central blocks 14, separated by a circumferential groove 13 and has a substantially rectangular shape.

The first module "C" comprises a second assembly still formed by four blocks 14. Two rectangular central blocks 14 are placed at the sides of the equatorial plane "X-X" of the tyre 1 and separated from each other by a circumferential groove 13. A lateral block 14 is arranged on each of the two sides of the central blocks 14, separated by a circumferential groove 13 and has a trapezoidal shape, with a greater base of the trapezoid axially directed towards the equatorial plane "X-X" of the tyre 1.

The two central blocks 14 of the second assembly have an overall axial width greater than an axial width of the two central blocks 14 of the first assembly.

The second module "D" also comprises a first and a second assembly 12 with blocks 14 similar to those described for the first assembly 12 but with different size, as specified above.

It follows that assemblies 12 of blocks 14 comprising two central blocks 14 having a first overall axial width are circumferentially alternated with assemblies 12 of blocks 14 comprising two central blocks 14 having a second overall axial width that is different from the first overall axial width.

The form of the lateral blocks 14 determines a curvature of the transverse grooves 11. The transverse grooves 11 have a wavy or curved middle line "M", intended as site of the points equidistant from the blocks 14 of the two assemblies 12 which delimit such grooves.

EXAMPLE

The Applicant has conducted some comparative tests on tyres, as described hereinbelow.

A front tyre and a rear tyre according to the invention were obtained with the characteristics reported in the following Table 1 (Tyre Set A).

TABLE 1

| Set A | |
|---|---|
| | Set A - Invention |
| Front tyre 120/70 R19 | |
| carcass structure | Radial |
| belt structure | Zero degrees |
| void/solid ratio 1 - Sb/St | 35% |
| Ratio: circumferential length of blocks/ width of transverse grooves L1/L2 | 2.20 |
| Ratio: circumferential length of blocks/ height of blocks L1/h1 | 3.70 |
| Curvature ratio f/C | 0.33 |
| Ratio: curvature height to total height f/H | 0.57 |
| Tread blend | (BR/SBR) polymer filled with 75% by weight of silica |
| Rear tyre 170/60 R17 | |
| carcass structure | Radial |
| belt structure | Zero degrees |
| void/solid ratio 1 - Sb/St | 30% |
| Ratio: circumferential length of blocks/ width of transverse grooves L1/L2 | 2.50 |
| Ratio: circumferential length of blocks/ height of blocks L1/h1 | 3.82 |
| Curvature ratio f/C | 0.26 |
| Ratio: curvature of height to total height f/H | 0.49 |
| Tread blend | (BR/SBR) polymer filled with 76% by weight of silica |
| E.T.R.T.O. speed codes | V (up to 240 km/h) |

The Applicant, for the purpose of improving performances, took the following tyres as base of the comparative driving test:

Set B—Pirelli for mainly road use;
Set C—Pirelli for mainly off-road use.

TABLE 2

| Sets B and C | | |
|---|---|---|
| | Set B | Set C |
| Front tyre 120/70 R19 | | |
| carcass structure | Radial | Radial |
| belt structure | Zero degrees | Cross belts |
| void/solid ratio 1 - Sb/St | 19% | 53% |
| Ratio: circumferential length of blocks/width of transverse grooves L1/L2 | NO BLOCKS | 1.45 |

TABLE 2-continued

| Sets B and C | | |
|---|---|---|
| | Set B | Set C |
| Ratio: circumferential length of blocks/height of blocks L1/h1 | NO BLOCKS | 3.20 |
| curvature ratio f/C | 0.33 | 0.29 |
| Ratio: curvature height to total height f/H | 0.57 | 0.40 |
| Tread blend | (BR/SBR) polymer filled with 95% by weight of silica | (BR/SBR) polymer filled with 100% CB |

Rear tyre 170/60 R17

| | | |
|---|---|---|
| carcass structure | Radial | Radial |
| belt structure | Zero degrees | Zero degrees |
| void/solid ratio 1 − Sb/St | 18% | 53% |
| Ratio: circumferential length of blocks/width of transverse grooves L1/L2 | NO BLOCKS | 1.30 |
| Ratio: circumferential length of blocks/height of blocks L1/h1 | NO BLOCKS | 2.90 |
| curvature ratio f/C | 0.30 | 0.24 |
| Ratio: curvature height to total height f/H | 0.50 | 0.39 |
| Tread blend | DUAL COMPOUND: (BR/SBR) polymer filled with 76% (center)-95% (shoulder) by weight of silica | 100% CB polymer (BR/SBR) |
| E.T.R.T.O. speed codes | V (up to 240 km/h) | T (up to 190 km/h) |

Road tests were executed (ON—handling in dry and wet conditions, holding in dry and wet conditions, stability and stability at full load conditions) with a BMW R1200 GS with 2.5 bar front-2.9 bar rear pressures.

Off-road tests were executed (OFF—performance, traction, handling) with a BMW R1200 GS with 1.0 bar front-1.0 bar rear pressures.

Figure 8:
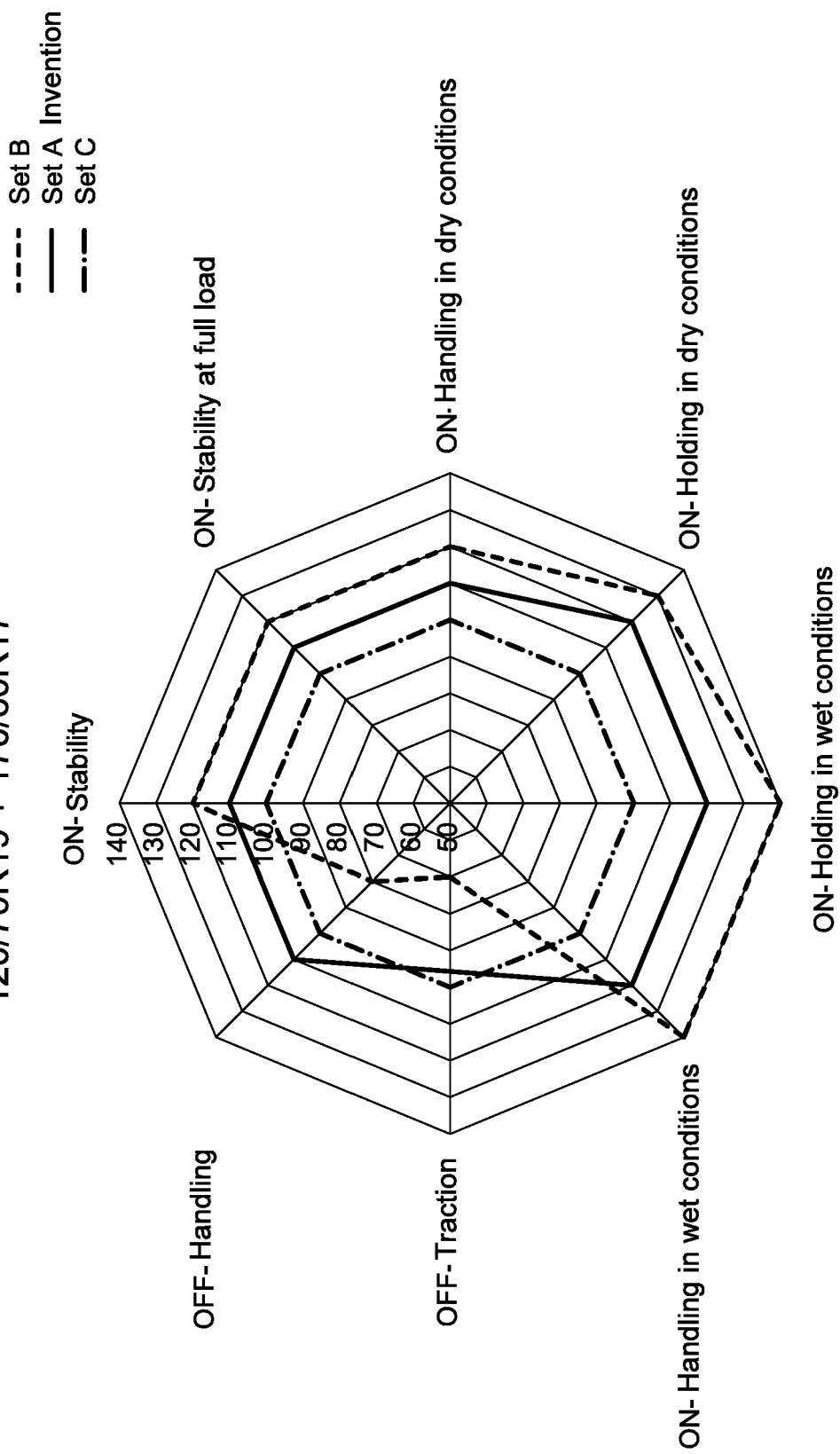
FIG. 8 illustrates a comparison radar chart.

The results of such tests are reported in the following comparative table (Table 3) and in the relative radar chart of FIG. 8. The results of these tests are expressed for comparison of Set A and Set B with respect to the reference Set C taken as base. The values reproduced in the following table represent an average value among those obtained in multiple test sessions.

TABLE 3

| | comparative | | |
|---|---|---|---|
| | Set A Invention | Set B | Set C |
| ON-Stability | 110 | 120 | 100 |
| ON-Stability at full load | 110 | 120 | 100 |
| ON-Handling in dry conditions | 110 | 120 | 100 |
| ON-Handling in wet conditions | 120 | 140 | 100 |
| ON-Holding in dry conditions | 120 | 130 | 100 |
| ON-Holding in wet conditions | 120 | 140 | 100 |
| OFF-Traction | 95 | 70 | 100 |
| OFF-Handling | 110 | 80 | 100 |

Table 3 shows that the tyres made in accordance with the present invention have on-road (ON ROAD) stability at high speeds, holding in dry conditions and handling only slightly worse than pure road tyres, hence decidedly greater than the performances offered by the known knobbed tyres for off-road use and even greater than the performances offered by the known motorcycles tyre for "big enduro" or "dual purpose" motorcycles, such as those described in the documents WO 2013/046004 and EP 2 307 208.

The tyres made in accordance with the present invention have a holding in wet conditions comparable to the carved road tyres.

The tyres made in accordance with the present invention have traction and handling properties off-road (OFF ROAD) that are decidedly greater than those of the abovementioned known motorcycles tyres for "big enduro" or "dual purpose" motorcycles (like those described in the documents WO 2013/046004 and EP 2 307 208). Surprisingly, the tyres according to the present invention offer a handling off-road greater than the pure knobbed tyres.

The optimal on-road conduct is obtained due to the road carcass and belt structure, as well as due to the high ratio between the circumferential length of the blocks and the circumferential width of the transverse grooves and that, unexpectedly, such optimal on-road conduct is not compromised by the presence of said grooves (which positively contribute to the traction off-road).

The selection of the ratio between the circumferential length of the blocks and the circumferential width of the transverse grooves allows optimising the on-road conduct compatibly with the traction off-road, and optimising the traction off-road compatibly with the on-road conduct, since the width of the grooves is such that said grooves are not stably filled with earth.

The selection of the ratio between the circumferential length of the blocks and the height of the blocks allows limiting the deformation of the blocks with respect to a pure knobbed tyre—hence optimising the on-road conduct and still ensuring the effective traction off-road since the tread clings to the loose terrain.

The aligned circumferential grooves allow the immediate evacuation of the mud in off-road conditions and their partial misalignment reduces the hinge effect on the profile, increasing the rigidity and ensuring the on-road performances of the tyre.

The invention claimed is:

1. A motorcycle tyre, comprising:
   a radial carcass structure;
   a belt structure applied in a radially outer position with respect to the radial carcass structure; and
   a tread band applied in a radially outer position with respect to the belt structure;
   the tyre having a curvature ratio (f/C) greater than or equal to about 0.25,
   wherein the tread band comprises:
   a plurality of blocks mutually spaced so as to define a tread pattern with a void/solid ratio (1−Sb/St) smaller than 50%;
   transverse grooves placed in succession along a circumferential extension of the tyre and each extending substantially over an entire axial width of the tread band, wherein each transverse groove substantially extends along an axial direction, wherein two successive transverse grooves circumferentially delimit an assembly of blocks placed in succession over the entire axial width of the tread band; and
   circumferential grooves delimiting the blocks of the assembly,
   wherein a ratio of a circumferential length (L1) of the blocks to a circumferential width (L2) of the transverse grooves is equal to or greater than about 2.

2. The motorcycle tyre according to claim 1, wherein the void/solid ratio ranges from about 25% to smaller than 50%.

3. The motorcycle tyre according to claim 1, wherein the ratio of the circumferential length (L1) of the blocks to the circumferential width (L2) of the transverse grooves is equal to or smaller than about 4.5.

4. The motorcycle tyre according to claim 1, wherein the tyre is a front tyre and the circumferential length (L1) of the blocks is greater than or equal to about 25 mm or wherein the tyre is a rear tyre and the circumferential length (L1) is greater than or equal to about 35 mm.

5. The motorcycle tyre according to claim 1, wherein the tyre is a front tyre and the circumferential length (L1) of the blocks is smaller than or equal to about 40 mm or wherein the tyre is a rear tyre and the circumferential length (L1) is smaller than or equal to about 50 mm.

6. The motorcycle tyre according to claim 1, wherein a ratio of a circumferential length (L1) of one of the blocks of the plurality of blocks to a height (h1) of the block is greater than or equal to about 3.

7. The motorcycle tyre according to claim 6, wherein the tyre is a front tyre and the height (h1) of the block is greater than or equal to about 6 mm or wherein the tyre is a rear tyre and the height (h1) of the block is greater than or equal to about 8.5 mm.

8. The motorcycle tyre according to claim 7, wherein the tyre is a front tyre and the height (h1) of the block is smaller than or equal to about 8.5 mm or wherein the tyre is a rear tyre and the height (h1) of the block is smaller than or equal to about 11 mm.

9. The motorcycle tyre according to claim 6, wherein the tyre is a front tyre and the ratio of the circumferential length (L1) of one of the blocks of the plurality of blocks to the height (h1) of the block is smaller than or equal to about 5.5 or wherein the tyre is a rear tyre and the ratio of the circumferential length (L1) of one of the blocks of the plurality of blocks to the height (h1) of the block is smaller than or equal to about 5.

10. The motorcycle tyre according to claim 9, wherein the tyre is a front tyre and the height (h1) of the block is greater than or equal to about 6 mm or wherein the tyre is a rear tyre and the height (h1) of the block is greater than or equal to about 8.5 mm.

11. The motorcycle tyre according to claim 10, wherein the tyre is a front tyre and the height (h1) of the block is smaller than or equal to about 8.5 mm or wherein the tyre is a rear tyre and the height (h1) of the block is smaller than or equal to about 11 mm.

12. The motorcycle tyre according to claim 1, wherein at least some of the circumferential grooves delimiting the blocks of the assembly are at least partially misaligned with respect to their respective circumferentially successive circumferential grooves delimiting the blocks of an adjacent assembly of blocks.

13. The motorcycle tyre according to claim 12, wherein at least some of the circumferentially successive circumferential grooves, at least partially misaligned, have a gap (L5) greater than or equal to about 4 mm.

14. The motorcycle tyre according to claim 12, wherein at least some of the circumferentially successive circumferential grooves, at least partially misaligned, have a gap (L5) smaller than or equal to about 6.5 mm.

15. The motorcycle tyre according to claim 1, wherein the tyre is a rear tyre and has a ratio of curvature height to total height (f/H) greater than or equal to about 0.4 or wherein the tyre is a front tyre and has a ratio of curvature height to total height (f/H) greater than or equal to about 0.4.

16. The motorcycle tyre according to claim 1, wherein the belt structure is at zero degrees.

17. The motorcycle tyre according to claim 1, wherein at least one portion of the tread band comprises a vulcanised elastomeric material obtained by vulcanising an elastomeric blend comprising 100 phr of at least one elastomeric polymer, from 30 to 130 phr of at least one reinforcing filler comprising at least 55% of an inorganic material chosen from silica alumina, silicates, hydrotalcite, calcium carbonate, kaolin, titanium dioxide, and mixtures thereof.

* * * * *